US007223058B2

(12) United States Patent
Nyhof

(10) Patent No.: US 7,223,058 B2
(45) Date of Patent: May 29, 2007

(54) BULK BAG DISCHARGING SYSTEM ASSEMBLY

(75) Inventor: Scott L. Nyhof, Hamilton, MI (US)

(73) Assignee: Material Transfer & Storage, Inc., Allegan, MI (US)

( * ) Notice: Subject to any disclaimer, the term of this patent is extended or adjusted under 35 U.S.C. 154(b) by 277 days.

(21) Appl. No.: 10/430,518

(22) Filed: May 6, 2003

(65) Prior Publication Data

US 2003/0206790 A1 Nov. 6, 2003

Related U.S. Application Data

(60) Provisional application No. 60/378,298, filed on May 6, 2002.

(51) Int. Cl.

| | |
|---|---|
| ***B65B 21/02*** | (2006.01) |
| ***B65B 43/00*** | (2006.01) |
| ***B65G 65/04*** | (2006.01) |
| ***B66C 1/02*** | (2006.01) |

(52) U.S. Cl. ........................ 414/415; 414/561; 53/492

(58) Field of Classification Search ................ 414/415, 414/412, 403, 421, 404, 419, 414, 291; 222/1, 222/185.1, 203, 95, 368, 105; 141/65, 317, 141/346, 10; 366/332; 248/99, 100, 95; 406/32; 251/212, 9, 326, 7, 8, 327

See application file for complete search history.

(56) References Cited

U.S. PATENT DOCUMENTS 2,547,502 A * 4/1951 Christianson et al. ...... 294/68.3
3,149,649 A * 9/1964 Hix ............................ 141/93
4,054,161 A * 10/1977 Alack .......................... 141/12
4,676,284 A 6/1987 DeCrane
4,863,065 A * 9/1989 Decrane ........................ 222/1

(Continued)

FOREIGN PATENT DOCUMENTS

DE 19934154 C1 * 10/2000

OTHER PUBLICATIONS

Flexicon Catalog, "More of what you want from a bulk food conveyor: Less of what you don't," 2005 (1 page).

(Continued)

*Primary Examiner*—Eileen D. Lillis
*Assistant Examiner*—Gregory Adams
(74) *Attorney, Agent, or Firm*—Price, Heneveld, Cooper, DeWitt & Litton, LLP

(57) ABSTRACT

In one embodiment of the present invention, a material container discharge assembly includes: a main frame assembly; material container impactors engaged to the main frame assembly; a discharge receiving gate having a material container receiving aperture and first, second, and third movable plates, where the first and third plates are movable between an open and closed position and further define a second plate receiving area for receiving the opposed second plate when the second plate and the first and third plates are in the closed position; and a substantially circular access chamber spaced below the material container receiving aperture that includes at least two access doors on substantially opposite sides of the chamber that operate to substantially air tight seal when closed and a sealing system having a sealing device movable between a disengaged position and an engaged position, where the engaged position operates to seal the container in position.

16 Claims, 9 Drawing Sheets

U.S. PATENT DOCUMENTS

| | | | | | |
|---|---|---|---|---|---|
| 4,872,493 | A | * | 10/1989 | Everman | 141/59 |
| 4,964,782 | A | | 10/1990 | DeCrane | |
| 5,033,935 | A | | 7/1991 | Decrane | |
| 5,036,893 | A | | 8/1991 | DeCrane | |
| 5,056,571 | A | | 10/1991 | Derby | |
| 5,320,251 | A | * | 6/1994 | Ellis | 222/105 |
| 5,348,063 | A | * | 9/1994 | Handleman | 141/314 |
| 5,354,166 | A | * | 10/1994 | De Crane | 414/561 |
| 5,400,837 | A | | 3/1995 | Kelley et al. | |
| 5,494,189 | A | * | 2/1996 | De Crane | 222/1 |
| 5,775,852 | A | * | 7/1998 | Boutte et al. | 406/32 |
| 5,787,689 | A | * | 8/1998 | Dearing | 53/492 |
| 5,787,945 | A | | 8/1998 | Riemersma | |
| 5,788,449 | A | * | 8/1998 | Riemersma | 414/415 |
| 6,089,283 | A | | 7/2000 | Sienerth et al. | |
| 6,149,110 | A | | 11/2000 | Gill et al. | |
| 6,340,100 | B1 | * | 1/2002 | Gill et al. | 222/105 |
| 6,427,955 | B1 | * | 8/2002 | Sterner et al. | 248/100 |
| 6,564,534 | B2 | | 5/2003 | Poulton et al. | |
| 6,776,197 | B1 | | 8/2004 | DeCrane | |

OTHER PUBLICATIONS

Flexicon Catalog, “Bulk bag filling just got faster, safer and easier,” 2004 (1 page).

Tech Pak, www.tech-pak.com/5000.htm, “Series 5000 Bulk Bag Filling Systems,” Jul. 9, 2004 (3 pages).

Tech Pak, www.teck-pak.com/PAKRAT.html, “Pakrat Series 4400H/P Bag Filling System,” Jul. 9, 2004 (3 pages).

Tech Pak, www.teck.pak.com/330e.html, “Quickpak Series 330E Bulk Bag Filling System,” Jul. 9, 2004 (2 pages).

National Bulk Equipment, Inc., “Hang-weigh bulk bag fillers,” 1999 (3 pages).

* cited by examiner

BULK BAG DISCHARGING SYSTEM ASSEMBLY

CROSS-REFERENCE TO RELATED APPLICATION

This application claims the benefit of U.S. Provisional Application No. 60/378,298, filed on May 6, 2002, the disclosure of which is hereby incorporated by reference in its entirety.

BACKGROUND OF THE INVENTION

Bulk bag discharging systems have been used to transfer materials, usually raw materials, from one container into another without contaminating the materials. Generally, bulk bag discharging systems lift a material-containing bag into a dispensing position. Once the bag is in position, an operator must somehow stretch the outlet portion of the bag material that is below a tie off point around a dispensing spout. This is extremely difficult in known bulk bag systems employing a dust free chamber around the dispensing spout because the dispensing spout is normally contained within a square chamber. When a dust free chamber is used, they only employ a single door on one side. As a result, there is no convenient way to seal the bag in a dust free manner because, before the bag is untied to release the contents, the loose bag material must be fitted around the dispensing spout, which is difficult if not impossible, for an operator when the only access point is a single door on one side of the chamber. The single door does not allow the operator to easily reach around the entire circumference of the spout and fit the loose bag material over the spout.

Additionally, prior bulk bag dispensing systems have used V-shaped impactors that run off one pneumatic cylinder and pinch together to squeeze the sides of the bulk bag, thereby preventing the formation of bridging/rat-holing, which is a condition whereby a material arches or bridges across a dispensing hole, resulting in sporadic flow or a complete cessation of flow. Massagers have also been used to help prevent rat-holing/bridging. The massagers used in the prior art are typically manufactured using square metal segments. As with the prior art impactors, the prior art massagers are typically positioned near the bottom of the bag and contact the bag on each side simultaneously.

Lastly, the prior art bulk bag dispensing apparatuses typically employ an iris type shut off valve above the dispensing aperture. Unfortunately, this design only allows the operator to stop the flow of material by closing the iris shut off valve when the material is flowing out of the bag. There simply is not enough strength in the prior art iris designs to close the container when the material itself is preventing the iris from closing.

Accordingly, there is a significant need for an easily operably, durable, heavy-duty bulk bag container discharging system, which can provide: an easily accessed dispensing chamber; a system for easily sealing the loose material of a bag container in a dust free fashion within the dispensing chamber; independently driven, adjustable impactors and massaging units, which will allow the operator to not only squeeze the bag using these systems but also rock the bag container back and forth in the same or different directions; and a flow stopping discharge system, which allows an operator to close the bag container at any time, including when the material is not flowing.

SUMMARY OF THE INVENTION

In one embodiment of the present invention, a material container discharge assembly includes: a main frame assembly having a hoist support engaged to the main frame assembly and a hoist moveably engaged with the hoist support; a material container transport component engaged to the hoist and adapted to engage a material container; at least two independently movable material container impactors engaged to the main frame assembly; a discharge receiving gate engaged to the main frame assembly having a material container receiving aperture and first, second, and third movable plates, where the first and third plates are movable between an open and closed position and further define a second plate receiving area for receiving the opposed second plate when the second plate and the first and third plates are in the closed position; and a substantially circular access chamber spaced below the material container receiving aperture and around a material receiving spout that includes at least two access doors on substantially opposite sides of the chamber that operate to substantially air tight seal when closed and a sealing system having a sealing device movable between a disengaged position and an engaged position, where the engaged position operates to seal the container in position over the spout.

In yet another embodiment of the present invention, a material container discharge assembly includes a main frame assembly and a discharge receiving gate engaged to the main frame assembly having a material container receiving aperture and first, second, and third substantially concave movable plates, where the first and third plates are movable between an open and closed position and further define a second plate receiving area for receiving the opposed second plate when the second plate and the first and third plates are in the closed position.

In another embodiment of the present invention, a material container discharge assembly includes: a main frame assembly; a material container receiving component engaged to the main frame assembly having a material container receiving aperture; and a substantially circular access chamber spaced below the material container receiving aperture having at least two access doors on substantially opposite sides of the chamber that operate to create a substantially air tight seal when closed.

In yet another embodiment of the present invention, a material container discharge assembly includes: a main frame assembly; a material container receiving component engaged to the main frame assembly having a material container receiving aperture and a spout; and a sealing system having a sealing ring that includes a metal ring engaged to a second ring and at least one pneumatic cylinder, where the sealing ring is movable between a disengaged position and an engaged position using at least one pneumatic cylinder and where the engaged position operates to seal the container in position over the spout.

These and other features, advantages and objects of the present invention will be further understood and appreciated by those skilled in the art by reference to the following specification, claims, and appended drawings.

DETAILED DESCRIPTION OF PREFERRED EMBODIMENT(S)

Figure 1:
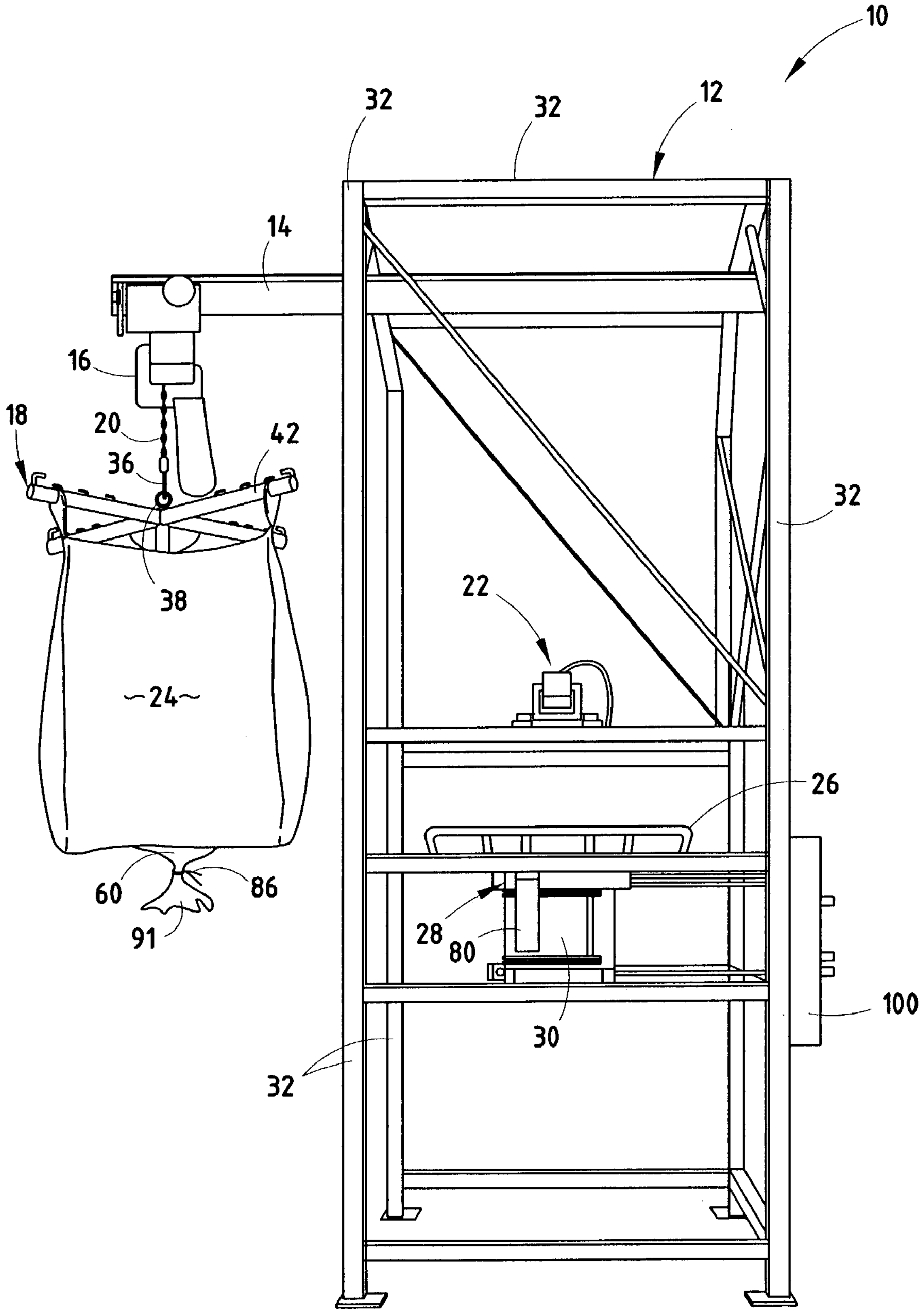
FIG. 1 is a side perspective view of the material discharge assembly of the present invention showing the material bag/container being moved into position.
Figure 2:
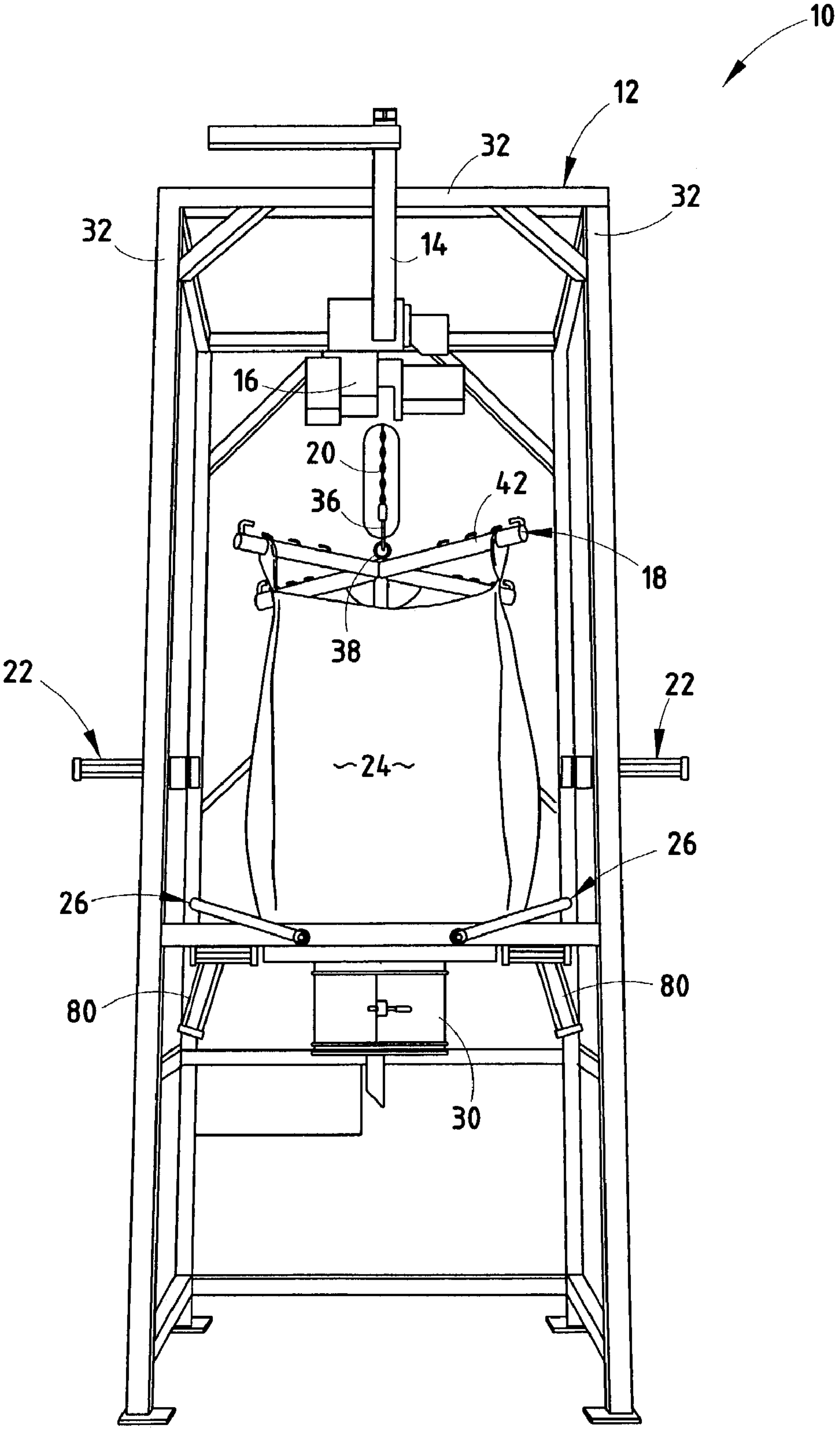
FIG. 2 is a front perspective view showing the material bag/container in the dispensing position within the material discharge assembly.
Figure 3:
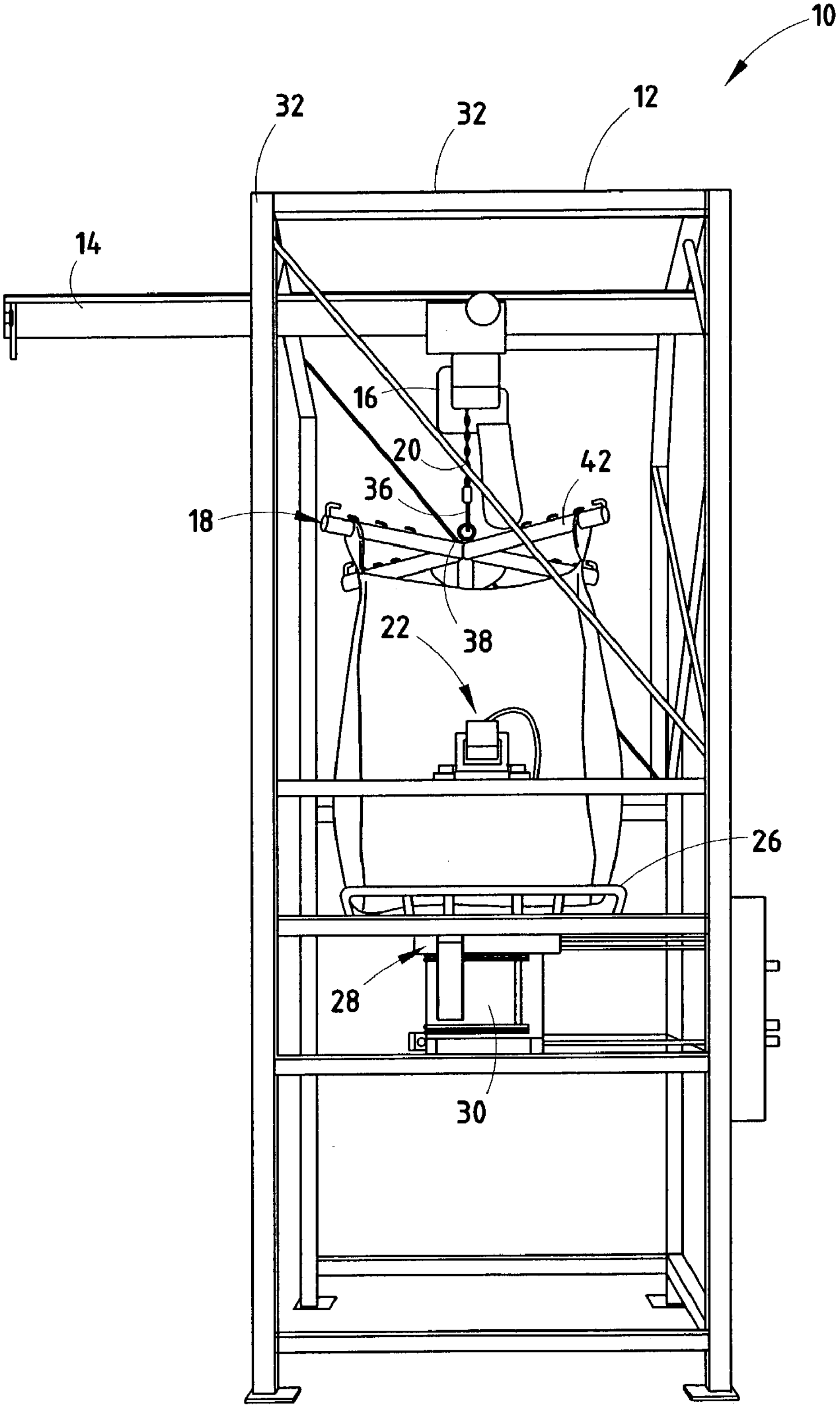
FIG. 3 is a side perspective view showing the material bag/container in the dispensing position within the material discharge assembly.

The discharge assembly 10 of the present invention typically includes a main frame assembly 12 that includes a hoist support 14 engaged to the main frame assembly 12 and a hoist 16 moveably engaged with the hoist support 14; a material container transport assembly 18 engaged to the hoist 16, typically by a heavy-duty chain 20; at least two independently movable material container impactors 22 adjustably engaged to the main frame assembly to accommodate different sized soft-sided material containers (bags) 24; at least two independently movable material container massaging frames 26 engaged to the main frame assembly 12; a discharge receiving gate 28; and a spout access chamber 30.

The main frame assembly 12 typically utilizes about three inch to about four inch diameter square tubing having about ¼ inch to about ⅝ inch thick walls about the perimeter of the main frame assembly 12. These perimeter pieces 32 are typically continuously welded with one another to provide added strength. The main frame assembly 12 further includes a hoist support 14, which is typically an I-beam engaged to the top of the main frame assembly 12. The I-beam is typically about an eight inch S-flange, approximately 23 pound beam that conforms to ASTM A36 carbon steel specifications. The hoist I-beam is typically engaged to the main frame assembly 12 with an about one inch thick plasma cut mounting support bracket. The cross support members 34 are typically about 1½ by 1½ by about 1½ inch square metal segments. The cross support members 34 are typically continuously welded to the other portions of the main frame assembly 12 to provide optimum strength. While not preferred, the cross support members 34 may be anchored to the structural members by any other suitable means, such as bolts and angle irons.

The hoist 16 is typically a heavy-duty hoist capable of lifting loads from about 1 ton to about 3 tons. Typically, the hoist is controlled with a conventional controller 17. The lifting strength of the hoist may be increased or decreased to any strength, depending on user need. The hoist 16 is operably coupled with a heavy-duty chain 20 or other lifting member. The heavy-duty chain 20 typically employs a steel hook 36. The steel hook 36 is typically mounted to the heavy-duty chain 20 such that it is allowed to rotate without binding the chain, usually utilizing a bearing in a ball and socket type arrangement.

Optionally, a forklift may be used in conjunction with a bag-hanging frame, which engages the bag 24. The bag suspends from the bag hanging fame and is moved into position with the forklift. The bag-hanging frame engages the main frame assembly. The bag-hanging frame typically engages the top of the main frame assembly and sets upon the four corners of the assembly. There are typically stacking pads on the top four corners of the main frame assembly that position the bag and the bag hanging assembly in the proper discharging position.

Figure 4:
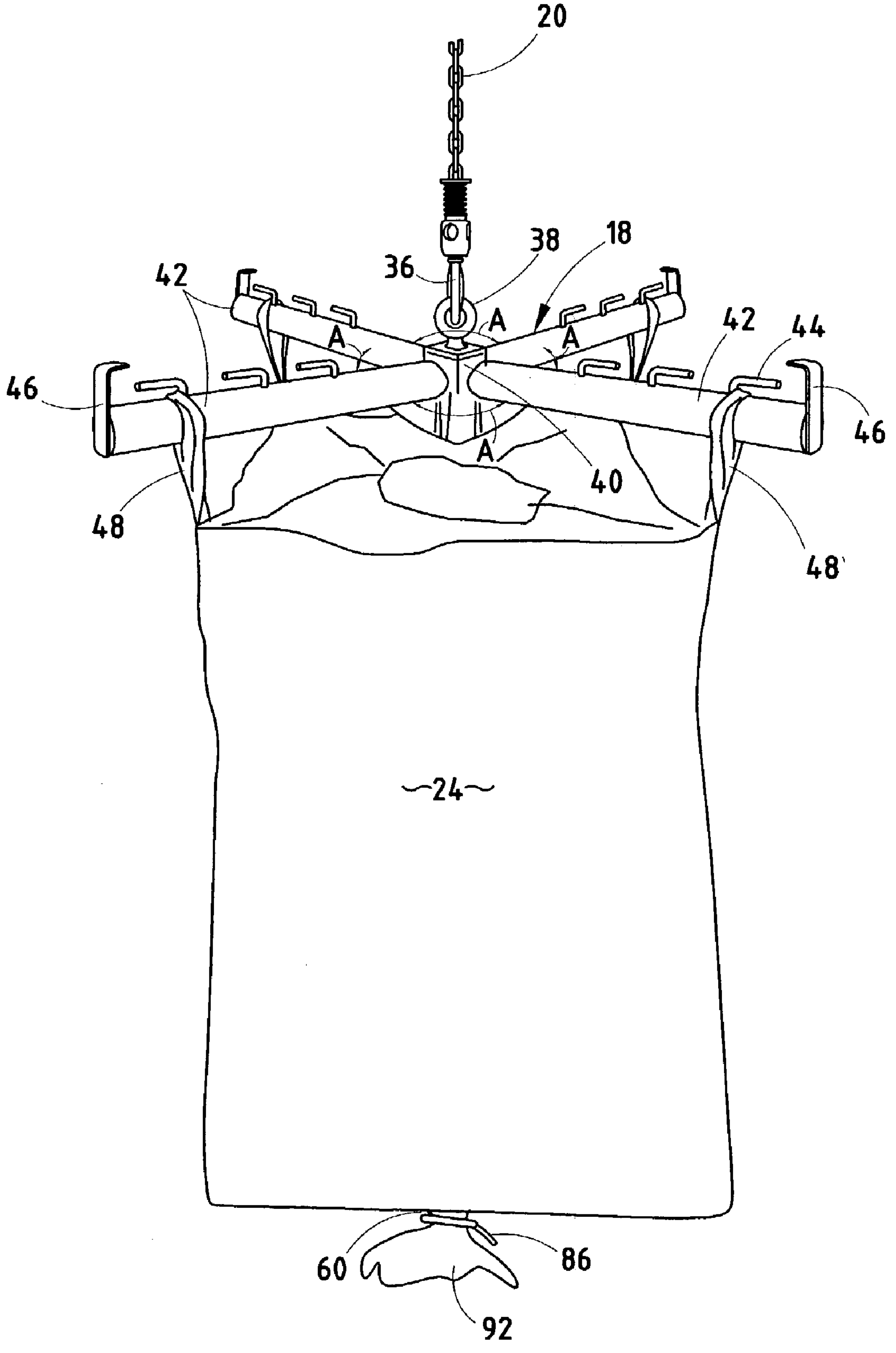
FIG. 4 is a perspective view of the material bag/container transport assembly of the present invention.

As shown in FIG. 4, the material container transport assembly 18 of the present invention is typically engaged to the hoist 16 by placing the hook 36 in the eyelet portion 38 of the material container transport assembly 18. The material container transport assembly 18 typically includes a central hub portion 40, four material container support members 42 engaged to the central hub portion via weld, extending at an upward angle of from about three degrees to about seven degrees, but, most typically about five degrees. The support members 42 typically are spaced at about 90 degree angles from one another (see Angle A in FIG. 4). Each of the material container support members 42 also typically include at least one outwardly extending bag loop retention member, which are typically L-shaped bent steel rods engaged to the support members via a weld or a nut and bolt type arrangement. In the preferred embodiment, there are three L-shaped outwardly extending bag loop support retention members 44 on each material container support member 42 to allow the transport assembly to easily accommodate material bags of various sizes.

Additionally, each material container support members 42 typically include an inwardly extending L-shaped bag loop retention member 46 engaged at or near the non-hub engaging end of the material container support members 42. These L-shaped inwardly extending bag retention members, while not necessary, assist in preventing the loops of the bag/container from falling off the ends of the material container support members when the bag is placed on the ground for removal from the material container transport assembly. Without the L-shaped inwardly extending bag loop retention members, the bag loops could unintentionally disengage from the material container support members of the transport assembly when the bag container is no longer held in position by gravity. The inwardly extending L-shaped bag loop retention members may be of any suitable height, but typically extend slightly higher than the outwardly extending bag loop retention members. Moreover, the inwardly extending L-shaped bag loop retention members are typically substantially flat bent members, while the outwardly extending bag loop retention members may be any suitable shape, but are typically cylindrical in shape.

Significantly, the fact that the material container support members 42 extend from the central hub portions at approximately five degrees accomplishes two significant functions. First, via gravity, the angle forces the loops of the bag containers into engagement with the L-shaped outwardly extending bag loop retention members 44 when the bag container is hoisted off of the ground, thereby providing safety benefits during such procedures. Secondly, this construction allows the distance from the bottom of the hoist hook 36 to the top of the bag loops 48 to be optimally minimized from zero inches to about 1½ inches. This allows manufacturers to install the entire bulk bag discharge assembly 10 in facilities with lower ceilings than were previously possible.

Figure 5:
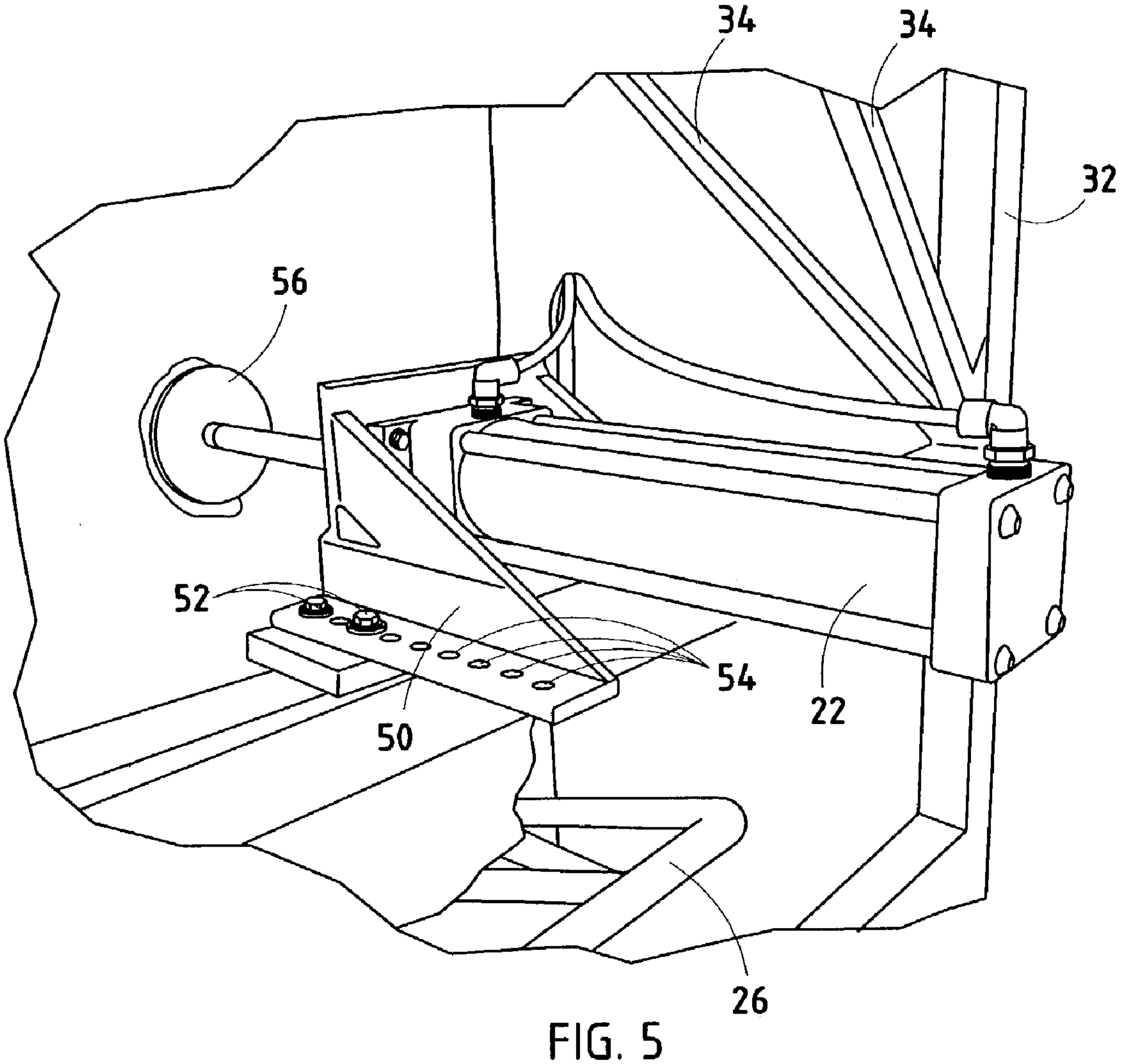
FIG. 5 is a perspective view of one of the independently movable material container impactors engaged to the main frame assembly.
Figure 6:
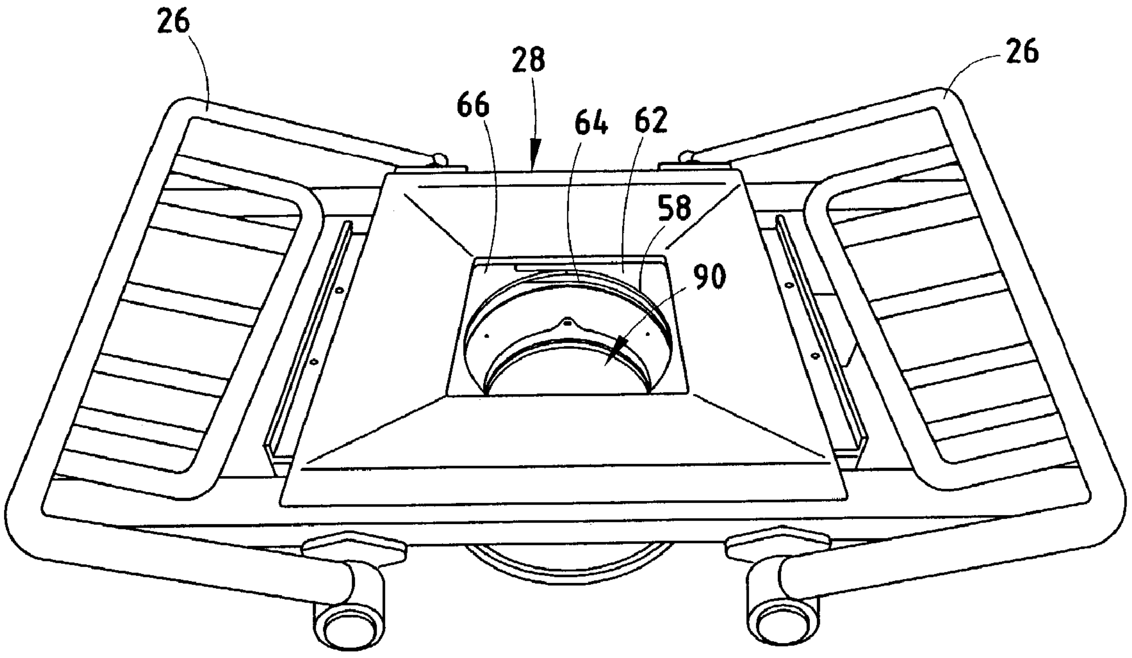
FIG. 6 is a perspective view of the at least two independently movable material container massaging frames and the discharge receiving gate, which is shown in the open position.

The bulk bag discharge assembly 10 also typically includes at least two independently driven pneumatic impactors 22 (FIG. 5), which are typically mounted to the main frame assembly 12 using a metal bracket 50 and a nut and bolt type arrangement 52 in spaced adjustment apertures 54 of the metal bracket 50. The spaced apart adjustment apertures 54 allow the impactors to be moved into a closer or more distant proximity to the material container/bag 24, as needed, to accommodate various sized material bags 24. The actual material container 24 contacting portion of the impactors is typically rounded and typically has a plastic or other soft material, which will not harm the bag container material, which is typically plastic or polyester. The impactors are typically located somewhere near the top ⅔ of the bag material container. The impactors of the present invention provide a force of up to about 1000 pounds on each side of the bag to push the material and collapse the rat-holing or bridging that may occur in the bag. The preferred force applied is between about 350 pounds of force to about 1000 pounds of force, but any desired force may, of course, be utilized. Aligning the impactors in this fashion allows the force to be directly at the center of the bag where most rat-holing occurs. The force is typically horizontal.

The impactors are adjustable in force, frequency, and stroke. The force may be adjusted by setting the pressure regulator to the desired setting. The frequency may be adjusted by setting an adjustable timer. The stroke may be adjusted by moving the unit in or out using the spaced adjustment apertures 54. Also, because the impactors are independent from one another, they can be set to stroke into the bag in an alternating fashion such that the right impactor will stroke in when the left impactor retracts and visa versa. This imparts a rocking motion to the bag 24, which further assists in collapsing any rat-holing that may occur in the material contained within the bag material container 24.

The bulk bag discharging assembly 10 of the present invention also typically contains at least two, typically independently driven, bag massagers 26, which are mounted such that they massage the bottom portion, typically the bottom about two feet, of the bag material container 24. The massagers are typically made of steel tubing and are pneumatically driven. The rounded steel tubing allows the assembly to be easily washed down when required. The pneumatic mechanism 80, that moves the massagers, as with the impactors, each independently provide a force of up to 1000 pounds on each side of the bag. The massagers 26, like the impactors 22, are adjustable in force and in frequency. The force is adjusted by setting the pressure regulator to the desired setting and the frequency is adjusted by setting an adjustable timer. Also, as with the impactors, the massagers can be set to stroke into the bag in alternating fashion. The massager on the right will stroke in, then, as it retracts, the massager on the left will stroke in and visa versa. Alternatively, the massagers and the impactors can be set to stroke in and out simultaneously.

Further, because each of the impactors and massagers are typically independently driven, the impactors and massagers may be used in conjunction with one another to prevent bridging and rat-holing by any combination of forces. In particular, operators may find that the right impactor and massager should apply force in alternating fashion with the left impactor and massager such that the bag container rocks back and forth. Also, the operator may find that the impactors and massagers may work together in opposing fashion to rock the top of the bag container in one direction while the bottom of the bag container is massaged in opposite directions by the massagers. Of course, pressure may be applied from all impactors and massagers simultaneously as well.

The bulk bag discharge assembly 10 also typically includes a discharge-receiving gate 28 having a material container-receiving aperture 58, which receives the spout portion 60 of the bag material container 24. The discharge receiving gate 28 also includes three, typically ultrahigh molecular weight plastic (or other durable material not likely to damage the bag material container) plates, which are typically concavely curved and, in the open position, define the material container receiving aperture 58. Two of the plates 62, 64 are substantially aligned, typically engaged with one another, and define a plate receiving area 90 for receiving the middle plate when the plates are in the closed position.

In operation, pneumatic cylinders apply force to the two substantially aligned plates and the middle plate 66 in opposing fashion such that the middle plate 66 is received in the middle plate receiving area 90 and is sandwiched between the substantially aligned plates 62, 64 as the plates move toward one another. This action not only pinches the bag material spout portion 60 from two sides, but, due to the concave shape of the plates, also cinches the bag from all around. This action closes the bag's spout portion and pulls it together such that the operator may easily tie off the bag. Moreover, when closed, the ultrahigh molecular weight (UHMW) plastic guide plates support the weight of the bag for better closure. The discharge-receiving gate of the present invention provides significantly more force than previously allowed by other designs, thereby allowing a user to close off standing columns of materials while previous materials must have been flowing in order to close off the bag material containers. The material need not be flowing in order to close off the material containers using the discharge-receiving gate of the present invention.

Figure 8:
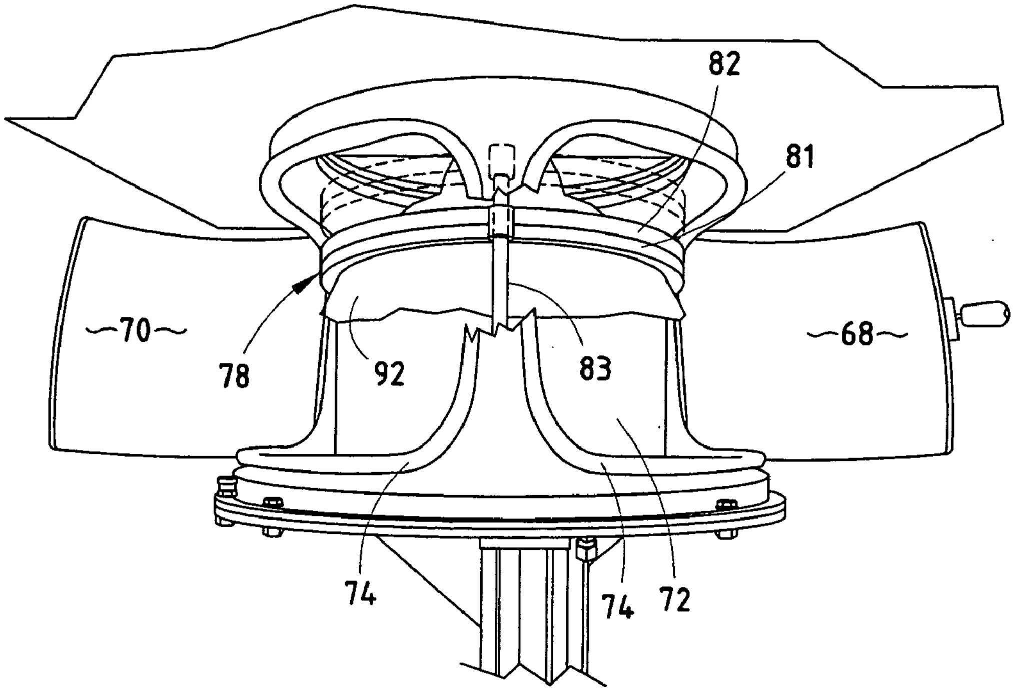
FIG. 8 is a perspective view of the spout access chamber to access doors in the open position and showing the movable sealing assembly in the open and bag sealing position.
Figure 9:
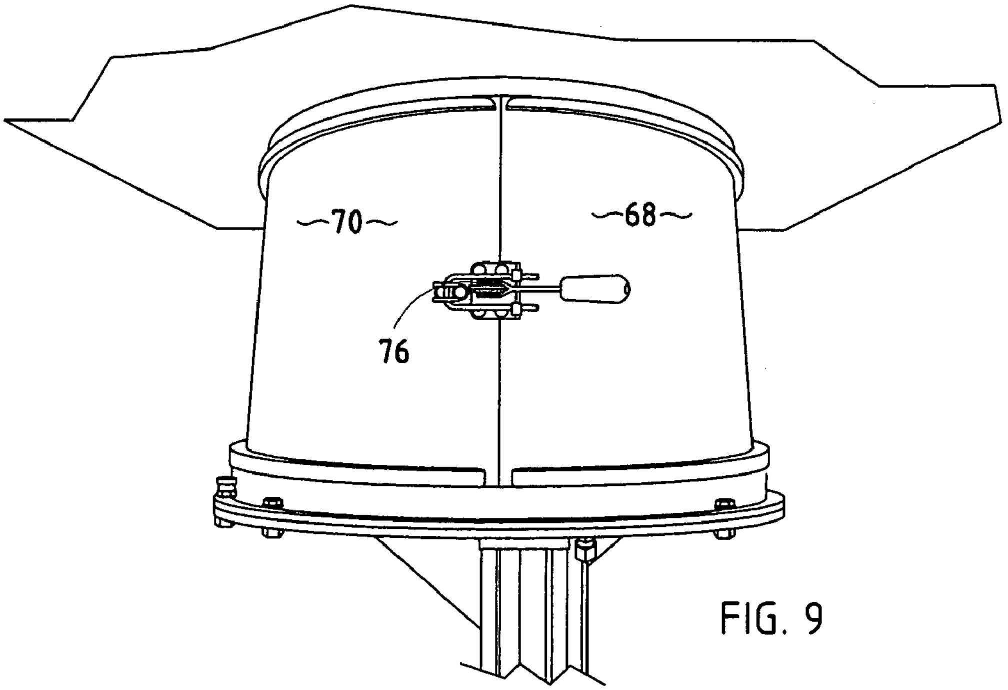
FIG. 9 is a perspective view of the spout access chamber, where the two access doors are closed.

The bulk bag material discharge assembly 10 also typically includes a circular dust tight spout access chamber 30 having at least two access doors 68, 70. The spout access chamber 30 is typically circular, but may be of any suitable shape. When the spout access chamber 30 is circular, the doors 68, 70 are gull wing doors, which open wide, thereby allowing access to nearly ⅔ of the spout access chamber. This allows significantly greater space than previous designs for operators to easily and more ergonomically attach a material container bag to the discharge spout. Better access to the spout also results in a significantly increased ability of the operator to achieve a successful seal between the bag spout portion 60 and the connection spool 72. The spout access chamber 30 typically has an airtight rubber seal 74 about the perimeter of the access openings. This allows for better dust tight sealing of the access chamber when the doors are closed. The doors 68, 70 are typically locked using a clamp 76 (see FIG. 8). Optionally, safety interlocks may be employed such that the discharge-receiving gate 28 and/or the bag container connection system discussed below cannot be moved or otherwise altered when the doors 68, 70 are open.

Figure 7:
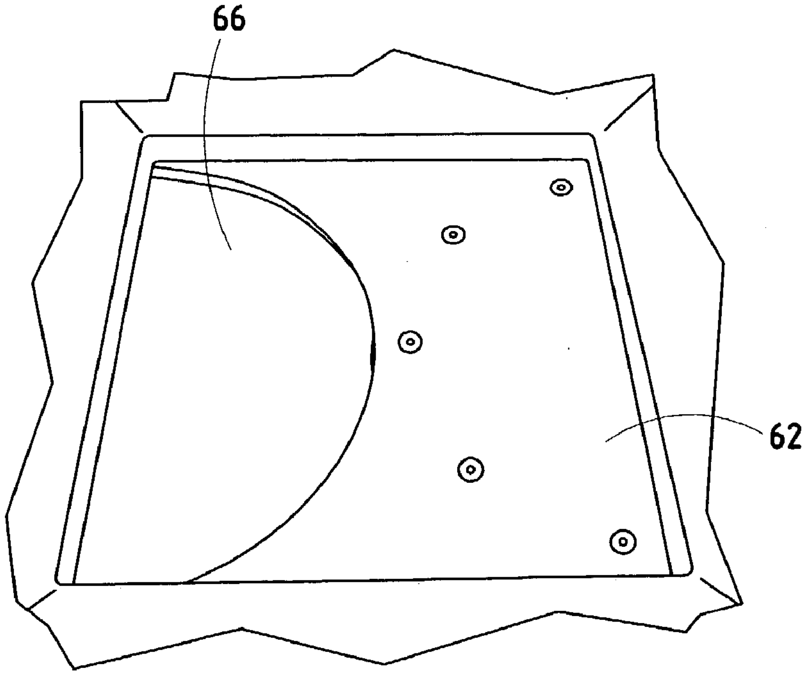
FIG. 7 is a perspective view of the discharge receiving gate, where the receiving aperture is closed by the curved first and third plates matingly receiving a second curved plate.

Contained within the spout access chamber 30 is a bag container connection system, which includes a pneumatically driven sealing ring that moves from a disengaged position to an engaged position (shown in FIG. 7). A sealing ring 81, which is typically a closed neoprene seal, is engaged to the bottom portion of the metal, typically steel, pneumatically driven ring 82. The pneumatic cylinders 83 may be positioned inside or outside, but typically are placed inside the access chamber 30. The neoprene sealing ring prevents damage to potentially fragile bag container material when it is sealed. In operation, the operator would open the doors of the spout access chamber 30, place the portion 92 of the bag container 24, which is below the tie 86 around the connection spool 72 or other outlet device while the bag connection system is in its disengaged state. Once the portion 92 below the tie 86 is positioned over the connection spool 72, the operator actuates the pneumatically or manually operated clamping mechanism into the engaged position, which seals the bag to the connection spout by clamping the portion 92 between the sealing ring and the connection spout. Optionally, a foot pedal may be used to operate the pneumatics 83 and thereby actuate the bag connection system between the engaged and disengaged position, but great care should be used to avoid personal injury if such a control system is used.

Once the bag material is in position and properly sealed, the operator merely unties the bag, closes the doors of the spout access chamber, and the bag is ready to be discharged. When a pneumatically actuated clamp is used in the bag connection system, a constant pressure is applied to the sealing ring. If the bag spout portion should move, stretch, or otherwise change the way that the bag is being clamped, the mechanism responds with equal pressure, thereby maintaining a positive seal.

The hoist 16, impactors 22, massagers 26, discharge receiving gate 28, and the bag container connection system are typically all electronically controlled by the operator utilizing control panel 100. Optionally, a CPU (central processing unit) may be utilized in the present invention to control and automate these functions or any combination of these functions.

Figure 10:
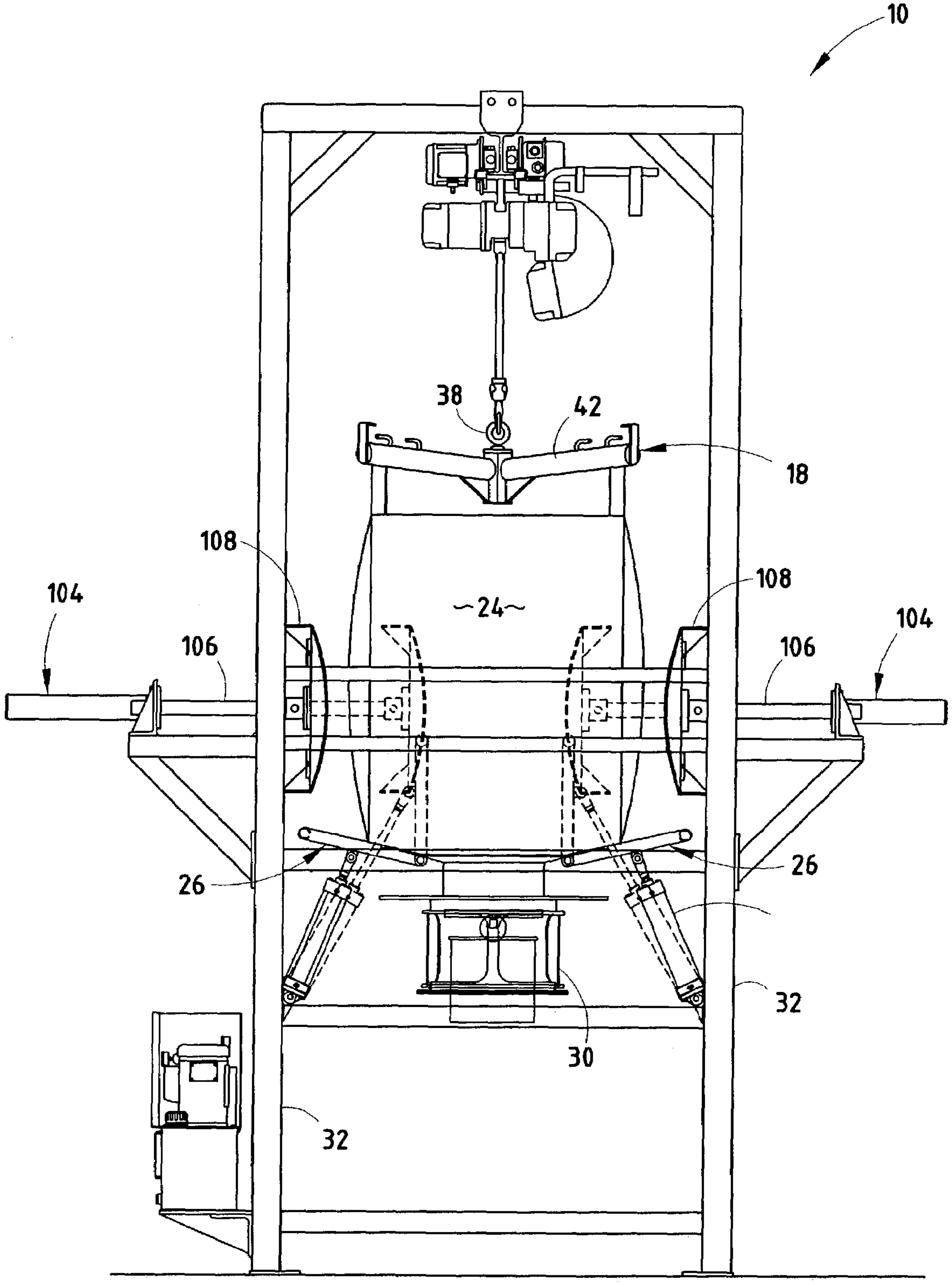
FIG. 10 is a side view of the material discharge assembly showing a side view of bag conditioning impactors of an embodiment of the present invention.
Figure 11:
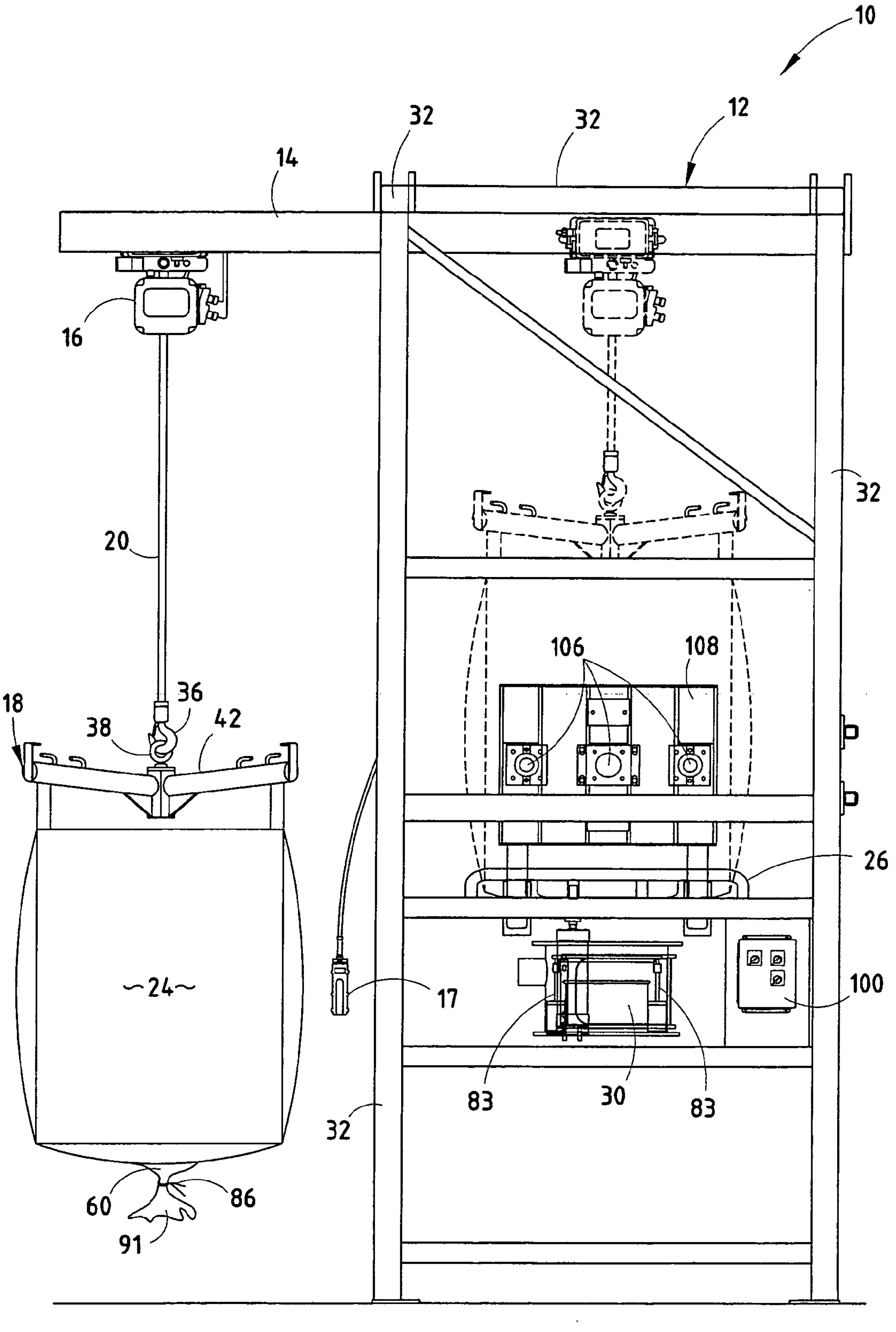
FIG. 11 is a side view of the material discharge assembly showing a front view of the bag conditioning impactors of an embodiment of the present invention.

As seen in FIGS. 10–11, the material discharge assembly of the present invention may also optionally include bag conditioning impactors 104 that are designed to at least partially break up or condition material in bag material container 24, which may have become hardened during transportation or due to exposure to any number of environmental conditions prior to reaching the ultimate location where the material will be transferred from the material container 24 using the material discharge assembly. For example, if salt were transported in a humid or wet environment, such as on a ship, the salt might harden due to this exposure. The bag conditioning impactors 104 operate to break up or condition the material that has hardened inside the material container, thereby allowing material to be discharged from the material container. Typically, at least one and, more typically, at least two or more hydraulic or pneumatic cylinders 106 with carbon steel conditioning frames 108 are used to apply force to the outside of the bag material container 24. The force applied and the force required to condition the material typically determines the related cylinder quantity and size. Typically, the bag conditioning impactors provide from about 1,000 lbs. to about 25,000 lbs. of force, but more typically about 16,000 lbs. of force. The bag conditioning impactors, unlike the typical pneumatic impactors 22 that are typically used in the present invention to prevent rat-holing, typically move in unison to impact the bag substantially simultaneously. However, conditioning may also be achieved by impacting the bag material container with one bag conditioning impactor at a time. Furthermore, while FIGS. 10–11 show two bag conditioning impactors, conceivably, any number of impactors could be used. Typically though, either two or four bag conditioning impactors positioned substantially opposite from one another are used. The carbon steel conditioning frames 108 may be of any suitable shape, but are typically a slightly curved smooth surface to help prevent damage to the bag material container when it is struck with the impactor(s).

If hydraulic conditioning impactors are used, the system typically employs a hydraulic pumping unit mounted on the side of the main frame assembly; however, the unit may also be free standing. The hydraulic pumping unit may also include a digital pressure switch to control and adjust unit operation and performance. The hydraulic pumping unit may be housed in an enclosure with a bolt on a louvered door for easy cleaning. If the conditioning impactors are pneumatic, the system may include all controls and other systems required to operate the unit in a similar fashion as the hydraulic unit.

Optionally, the bag conditioning impactors may be mounted on a separate bag conditioning frame assembly. Such an assembly would be used alone or in conjunction with the material discharge assembly.

Any component or combination of components discussed herein may also be manufactured from stainless steel, which is typically used for corrosion prevention, wash-down, and for food material applications.

The above description is considered that of the preferred embodiments only. Modification of the invention will occur to those skilled in the art and to those who make or use the invention. Therefore, it is understood that the embodiments shown in the drawings and described above are merely for illustrative purposes and not intended to limit the scope of the invention, which is defined by the following claims as interpreted according to the principles of patent law, including the doctrine of equivalents.

I claim:

1. A material container discharge assembly comprising:

a main frame assembly comprising a support frame, a hoist support engaged to the main frame assembly, and a hoist moveably engaged with the hoist support;

a material container transport component engaged to the hoist and adapted to engage a material container;

at least two independently movable material container impactors engaged to the main frame assembly;

a discharge receiving gate engaged to the support frame comprising a material container receiving aperture and first, second, and third movable plates, wherein the first and third plates are movable between an open and closed position and further define a second plate receiving area for receiving the opposed second plate when the second plate and the first and third plates are in the closed position and the first, second, and third plates define a container support surface when the plates are in the closed position; and a substantially circular access chamber spaced below the material container receiving aperture and around a material receiving spout comprising:

at least two access doors on substantially opposite sides of the chamber that operate to create a substantially air tight seal when closed; and a sealing system comprising a sealing device movable between a disengaged position and an engaged position, wherein the engaged position operates to seal the container in position over the spout.

2. The material container discharge assembly of claim 1 further comprising at least two bag massagers engaged to the main frame assembly.

3. The material container discharge assembly of claim 2, wherein the at least two bag massagers are engaged to the main frame assembly such that each of the bag massagers impacts the same side of the material container as one of the material container impactors.

4. The material container discharge assembly of claim 3, wherein the impactors and massagers apply force in alternating fashion such that the material container rocks back and forth.

5. The material container discharge assembly of claim 3, wherein the material container comprises a top portion and a bottom portion and the impactors and managers apply a first force and second force in opposing fashion such that the first force is applied to rock the top portion of the material container in a first direction while a second force is applied to rock the bottom portion of the material container in a second direction.

6. The material container discharge assembly of claim 2, wherein the bag massagers are mounted such that they massage the bottom portion of the bag material.

7. The material container discharge assembly of claim 1, wherein the sealing device comprises a sealing ring.

8. The material container discharge assembly of claim 7, wherein the sealing ring comprises a metal ring engaged to a neoprene ring.

9. The material container discharge assembly of claim 8, wherein the sealing ring is moved between the disengaged and engaged position using at least one pneumatic cylinder.

10. The material container discharge assembly of claim 8, wherein the sealing ring is moved between the disengaged and engaged position using two pneumatic cylinders.

11. The material container discharge assembly of claim 1, wherein the material container impactors impact the material container at different moments in time.

12. The material container discharge assembly of claim 1, wherein the material container impactors impact the material container at substantially the same time.

13. The material container discharge assembly of claim 1, wherein the material container transport component comprises a central hub portion comprising an eyelet portion and four material container support members engaged to the central hub portion and extending therefrom at an upward angle of from about three to about seven degrees, and wherein the material container support members are spaced at about 90 degree angles from one another about the central hub.

14. The material container discharge assembly of claim 13, wherein each container support member further comprises at least one outwardly extending bag loop retention member.

15. The material container discharge assembly of claim 14, wherein each container support member comprises a plurality of outwardly extending substantially L-shaped bag loop retention members.

16. The material container discharge assembly of claim 14, wherein each container support member further comprises an inwardly extending substantially L-shaped bag loop retention member.

* * * * *